United States Patent
Tsai et al.

(10) Patent No.: US 8,459,079 B2
(45) Date of Patent: Jun. 11, 2013

(54) AUTO-SCRAPING APPARATUS

(75) Inventors: Ying-Chien Tsai, Niaosong Township (TW); Jia-Hao Li, Niaosong Township (TW); Jeng-Nan Lee, Niaosong Township (TW); Wen-Yuh Jywe, Huwei Chen (TW)

(73) Assignees: National Formosa University, Yunlin Hsien (TW); Cheng Shiu University, Kaohsiung County (TW)

( * ) Notice: Subject to any disclaimer, the term of this patent is extended or adjusted under 35 U.S.C. 154(b) by 356 days.

(21) Appl. No.: 12/805,352

(22) Filed: Jul. 27, 2010

(65) Prior Publication Data

US 2012/0028549 A1 Feb. 2, 2012

(51) Int. Cl.
*B21D 19/04* (2006.01)

(52) U.S. Cl.
USPC .............. 72/70; 72/71; 72/112; 72/324

(58) Field of Classification Search
USPC .......... 72/67, 68, 70, 112, 441, 444, 446, 72/447, 455, 456, 705, 71, 324; 451/80, 340; 30/169; 15/93.1, 93.4; 29/81.11; 425/276, 425/472
See application file for complete search history.

(56) References Cited

U.S. PATENT DOCUMENTS

| | | | | | |
|---|---|---|---|---|---|
| 3,143,923 | A | * | 8/1964 | Krzyszczuk | 409/313 |
| 4,658,485 | A | * | 4/1987 | Yang | 29/26 A |
| 5,216,964 | A | * | 6/1993 | Sato et al. | 83/471.3 |
| 6,357,094 | B1 | * | 3/2002 | Sugimoto | 29/27 C |
| 6,447,224 | B2 | * | 9/2002 | Mitsuzono et al. | 409/201 |
| 2011/0275280 | A1 | * | 11/2011 | Jywe et al. | 451/5 |
| 2011/0287699 | A1 | * | 11/2011 | Tsai et al. | 451/340 |

* cited by examiner

*Primary Examiner* — Dana Ross
*Assistant Examiner* — Leonel Vasquez
(74) *Attorney, Agent, or Firm* — Bacon & Thomas, PLLC (57) ABSTRACT

An auto-scraping apparatus for a work piece of a hard rail has a tracking device, a driving device and a tool device. The tracking device has a connecting frame, a moving frame, a lifting frame and a tool frame. The moving frame is movably connected to the connecting frame. The lifting frame is movably connected to the moving frame. The tool frame is rotatably connected to the lifting frame. The driving device is connected to the tracking device and has two linear motion units and a rotating motion unit. One of the linear motion units drives the moving frame and the other linear motion unit drives the lifting frame. The rotating motion unit is mounted in the tool frame and has a rotating shaft. The tool device is detachably connected to the driving device and has a tool carrier and a relieving tool.

9 Claims, 12 Drawing Sheets

|  | X-axis linear motion unit | Z-axis linear motion unit | Rotating motion unit |
|---|---|---|---|
| Quadrate recess | ○ | ○ | × |
| Triangular recess | ○ | ○ | × |
| half-moon shaped recess | ○ | ○ | ○ |
| plover-shaped recess | ○ | ○ | ○ |

FIG.13

AUTO-SCRAPING APPARATUS

BACKGROUND OF THE INVENTION

1. Field of the Invention

The present invention relates to an auto-scraping apparatus for a work piece that can scrape a surface of the work piece conveniently and automatically so that the work piece is scraped as hand scraping by a professional.

2. Description of the Prior Arts

A conventional scraping process uses human hands to scrape a contacting surface of a conventional hard rail to eliminate processing inaccuracy from the machine tools and to form multiple recesses in the contacting surfaces of the conventional hard rail. There are two conventional methods to scrape a work piece: manual scraping method and semi-automatic manual scraping method. In the conventional manual scraping method, a relieving tool is used to scrape recesses into a surface of a work piece. In the semi-automatic manual scraping method, a semi-automatic scraping machine is used to scrape recesses into a surface of a work piece.

However, the conventional scraping methods are operated manually to scrape recesses in the work piece, and scraping quality is dependent on worker experience and is subject to human error. In addition, the conventional methods are difficult to learn and are time-consuming. Furthermore, the conventional semi-automatic scraping machine is heavy and is not easy to operate.

To overcome the shortcomings, the present invention provides an auto-scraping apparatus for a work piece to mitigate or obviate the aforementioned problems.

SUMMARY OF THE INVENTION

The main objective of the present invention is to provide an auto-scraping apparatus for a work piece that can scrape a surface of the work piece conveniently and automatically so that the work piece is scraped as hand scraping by a professional.

The auto-scraping apparatus for a work piece of a hard rail in accordance with the present invention has a tracking device, a driving device and a tool device. The tracking device has a connecting frame, a moving frame, a lifting frame and a tool frame. The moving frame is movably connected to the connecting frame. The lifting frame is movably connected to the moving frame. The tool frame is rotatably connected to the lifting frame. The driving device is connected to the tracking device and has two linear motion units and a rotating motion unit. One of the linear motion units drives the moving frame to move forward or backward relative to the connecting frame and the other linear motion unit drives the lifting frame to move upward or downward relative to the moving frame. The rotating motion unit is mounted in the tool frame and has a rotating shaft. The tool device is detachably connected to the driving device and has a tool carrier and a relieving tool. The tool carrier is securely mounted around the rotating shaft of the rotating motion unit. The relieving tool is securely mounted on the tool carrier Other objectives, advantages and novel features of the invention will become more apparent from the following detailed description when taken in conjunction with the accompanying drawings.

DETAILED DESCRIPTION OF THE PREFERRED EMBODIMENTS

With reference to FIGS. 1 to 3 and 8, an auto-scraping apparatus for a work piece 60, such as a hard rail, in accordance with the present invention comprises a tracking device 10, a driving device 20 and a tool device 30.

Figure 1:
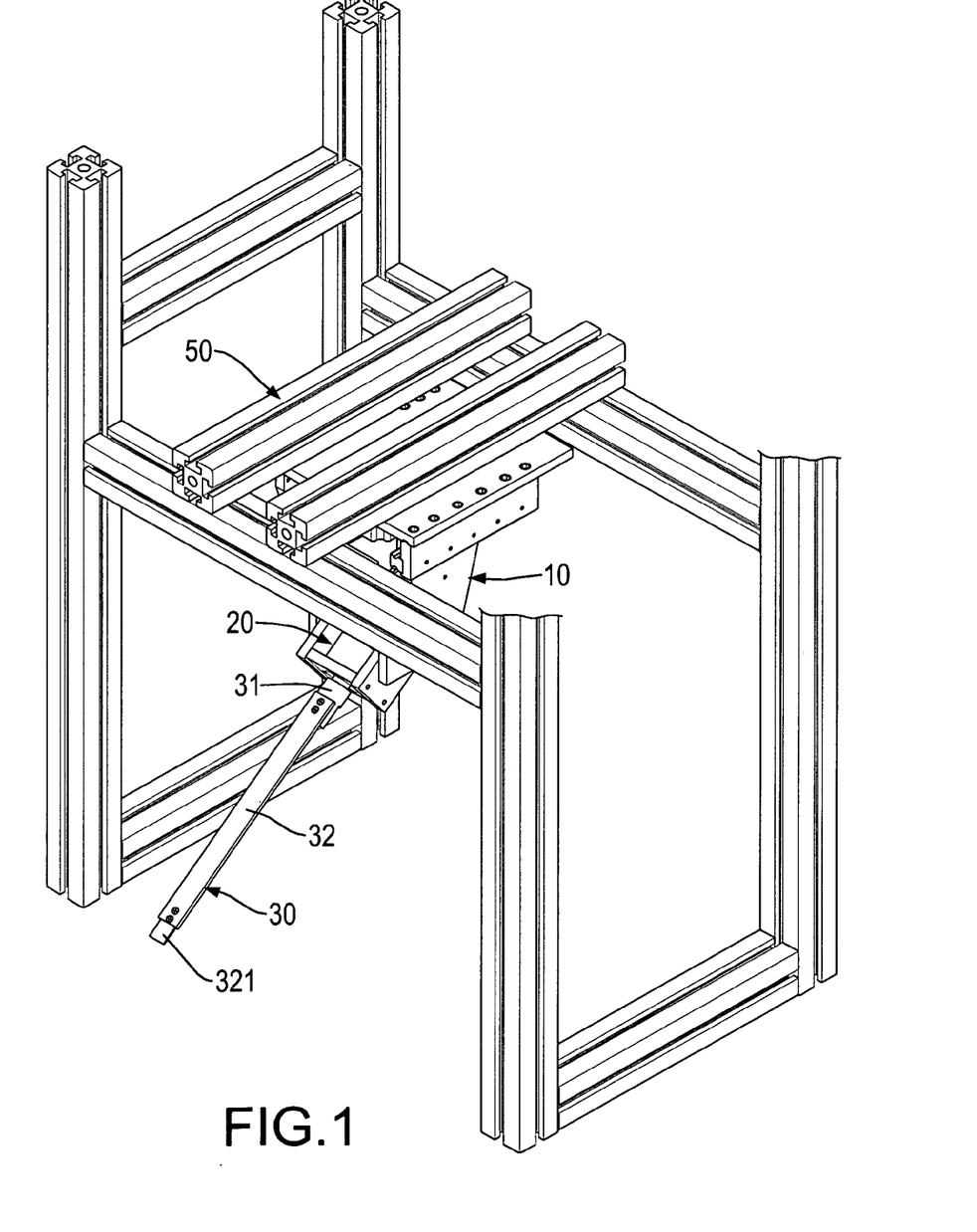
FIG. 1 is a perspective view of an auto-scraping apparatus in accordance with the present invention mounted on a three-dimensional rack device.
Figure 2:
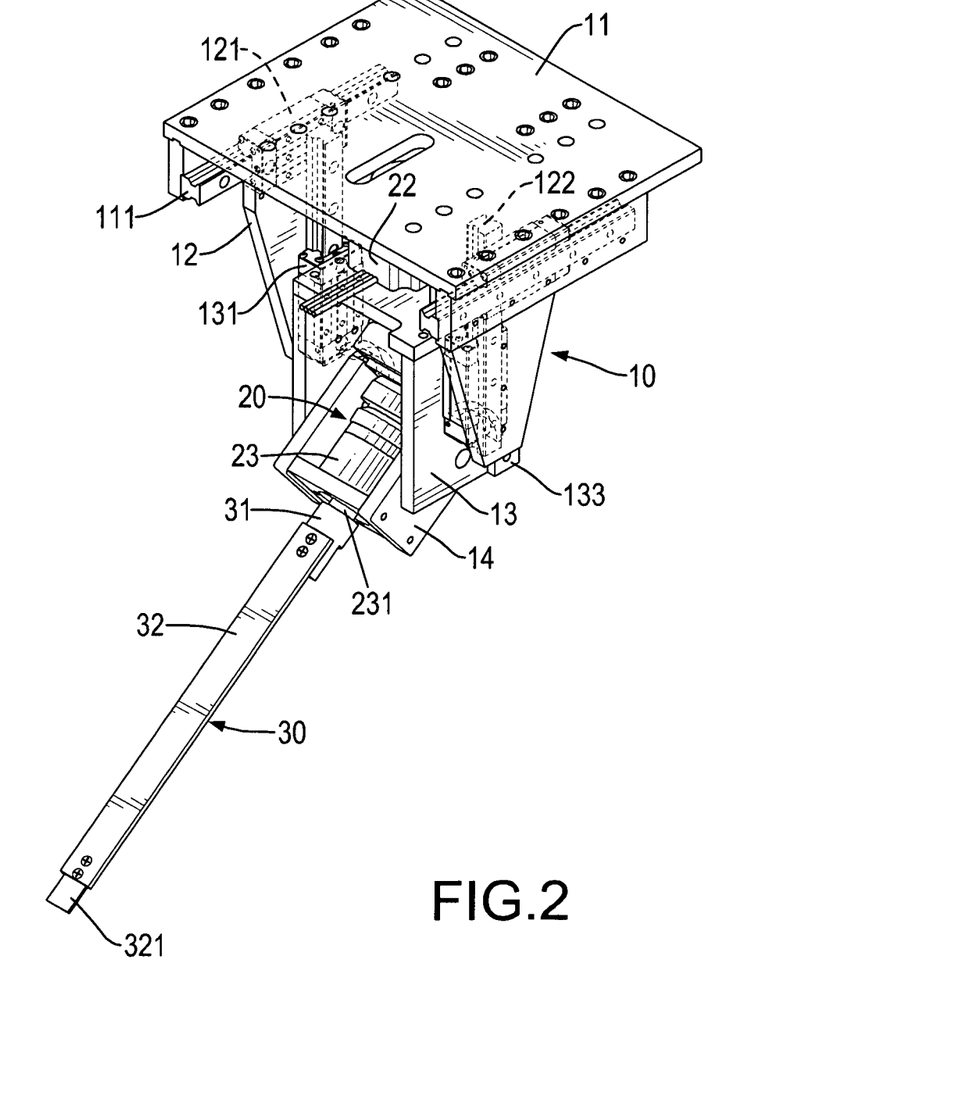
FIG. 2 is an enlarged perspective view of the auto-scraping apparatus in FIG. 1.
Figure 3:
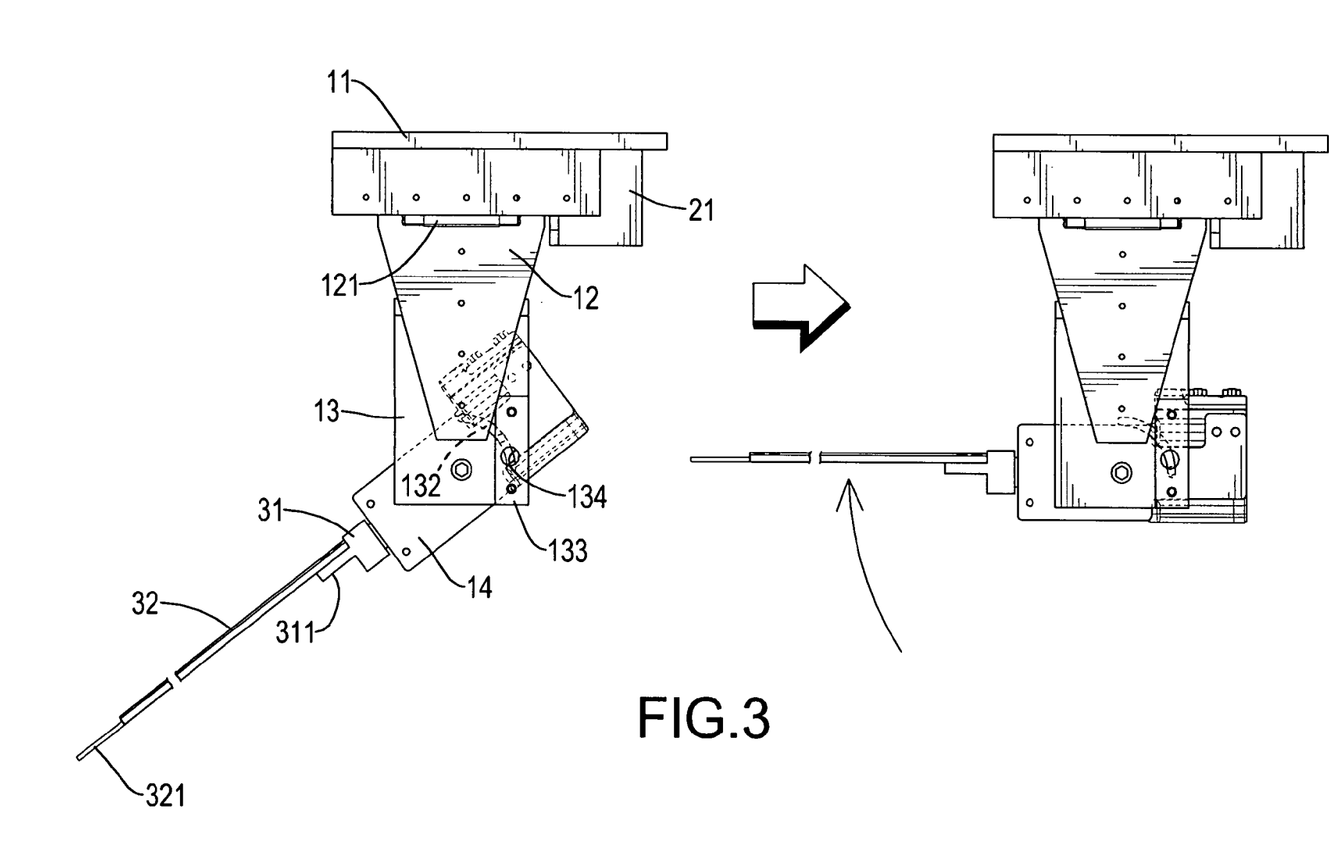
FIG. 3 are operational side views of the auto-scraping apparatus in FIG. 1 being adjusted.

The tracking device 10 may be mounted on a spindle of a CNC machine tool above a working table or mounted on a three-dimensional rack device 50 and has a connecting frame 11, a moving frame 12, a lifting frame 13 and a tool frame 14.

The connecting frame 11 may be U-shaped, is securely connected to the spindle of the CNC machine tool or the three-dimensional rack device 50 and has two sidewalls and two transversal rails 111. Each sidewall of the connecting frame 11 has an inner surface facing to each other. The transversal rails 111 are respectively mounted on the inner surfaces of the sidewalls of the connecting frame 11.

The moving frame 12 is movably connected to the connecting frame 11 and has two opposite sidewalls, two sliding blocks 121 and two longitudinal rails 122. The opposite sidewalls of the moving frame 12 respectively face to the sidewalls of the connecting frame 11 and each opposite sidewall has an outer surface and an inner surface. The sliding blocks 121 are respectively mounted on the outer surfaces of the opposite sidewalls of the moving frame 12 and are respectively and movably mounted on the transversal rails 111 of the connecting frame 11. The longitudinal rails 122 are respectively mounted on the inner surfaces of the opposite sidewalls of the moving frame 12 and are perpendicular to the transversal rails 111.

Figure 7:
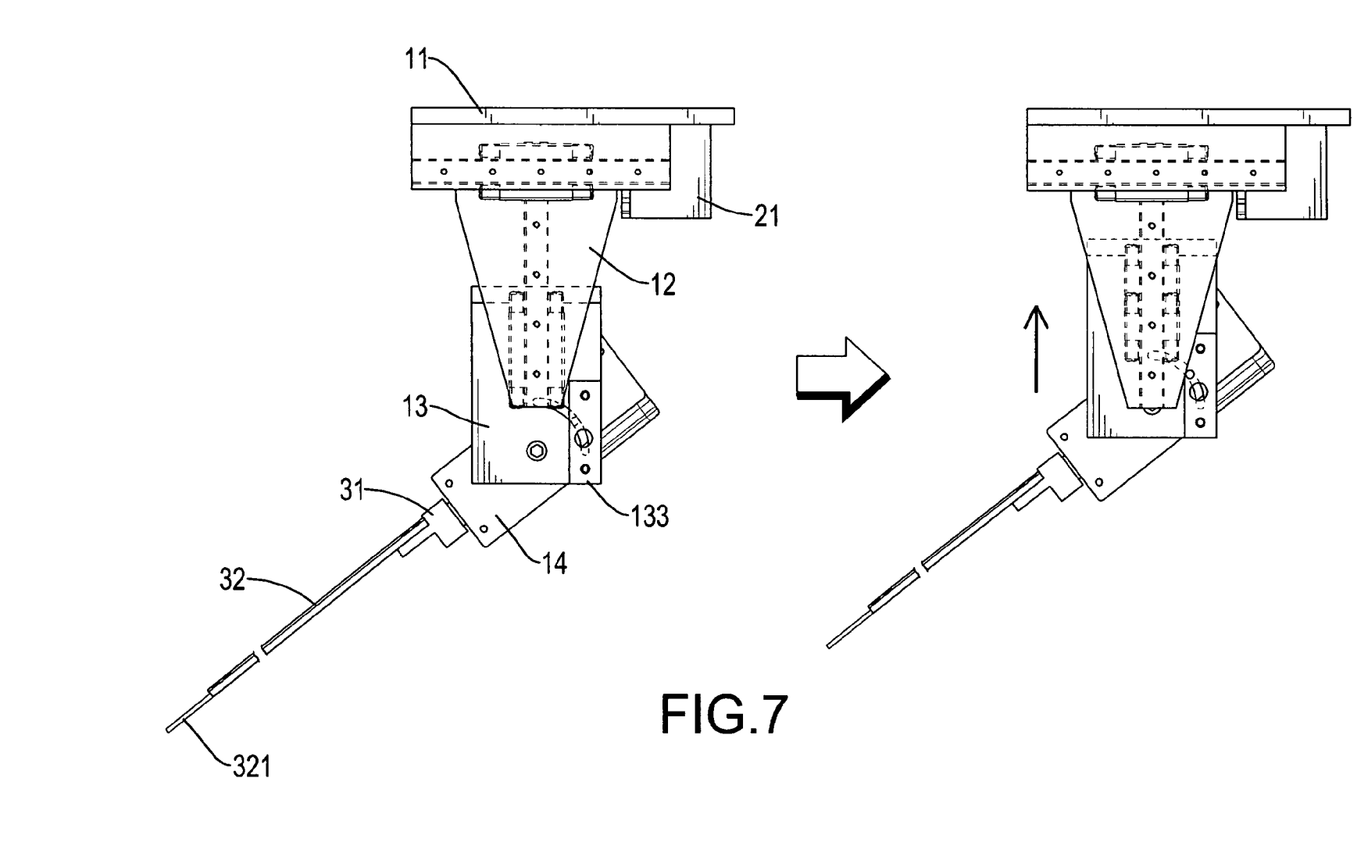
FIG. 7 are operational side views of the auto-scraping apparatus in FIG. 1 being lifted.

The lifting frame 13 is movably connected to the moving frame 12 and has two sidewalls, two lifting blocks 131, an adjusting groove 132 and a holding mount 133. The sidewalls of the lifting frame 13 respectively face to the inner surfaces of the opposite sidewalls of the moving frame 12 and each sidewall of the lifting frame 13 has an outer surface and an inner surface. The lifting blocks 131 are respectively mounted on the outer surfaces of the sidewalls of the lifting frame 13 and are respectively and movably mounted on the longitudinal rails 122 of the moving frame 12. Then, the lifting frame 13 can be moved upward or downward relative to the moving frame 12 as shown in FIG. 7. The adjusting groove 132 is curved and is formed through one of the sidewalls of the lifting frame 13. The holding mount 133 is mounted on the sidewall of the lifting frame 13 in which the adjusting groove 132 is defined and has a connecting hole 134. The connecting hole 134 is formed through the holding mount 133 and communicates with the adjusting groove 132.

The tool frame 14 is pivotally connected to the lifting frame 13. A fastener can be mounted through the connecting hole 134 and the adjusting groove 132 to press against the tool frame 14. Then, the tool frame 14 can be held on the lifting frame 13 in place by the fastener.

Figure 4:
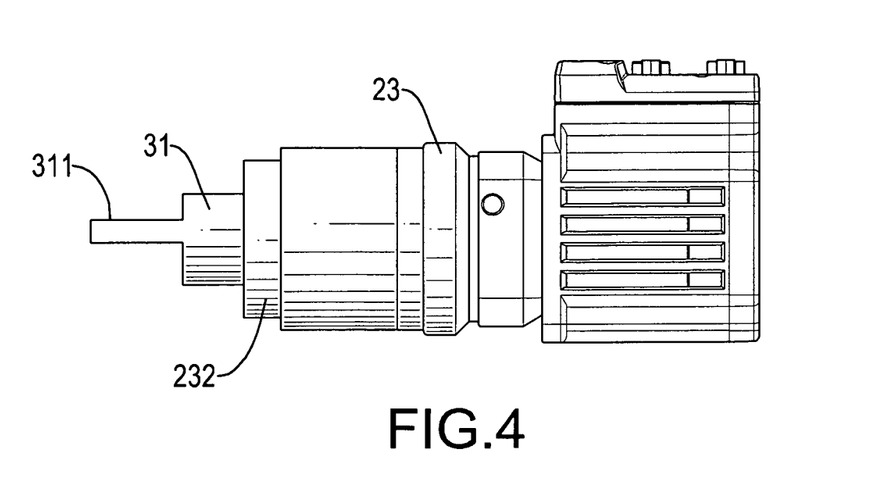
FIG. 4 is an enlarged side view of a driving device of the auto-scraping apparatus in FIG. 1.
Figure 5:
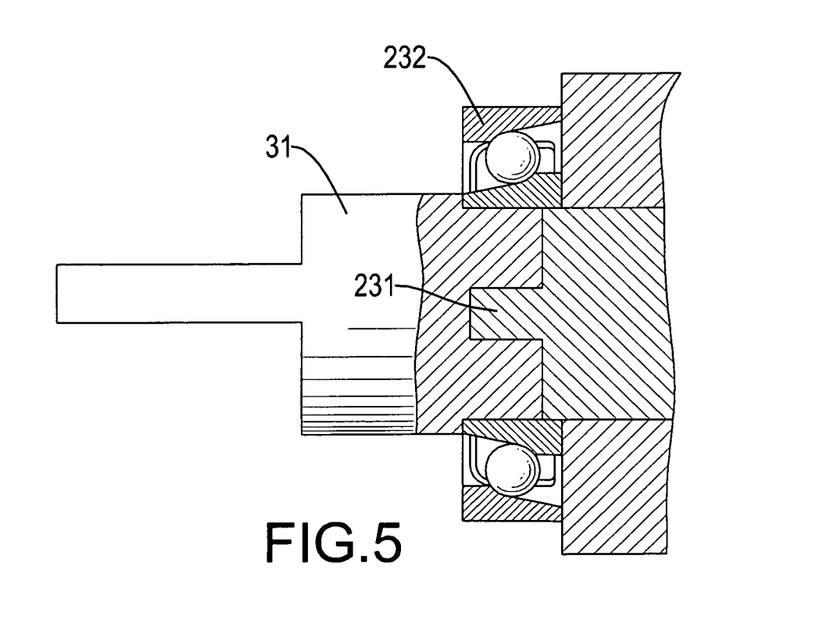
FIG. 5 is an enlarged side vice in partial section of the driving device in FIG. 4.
Figure 6:
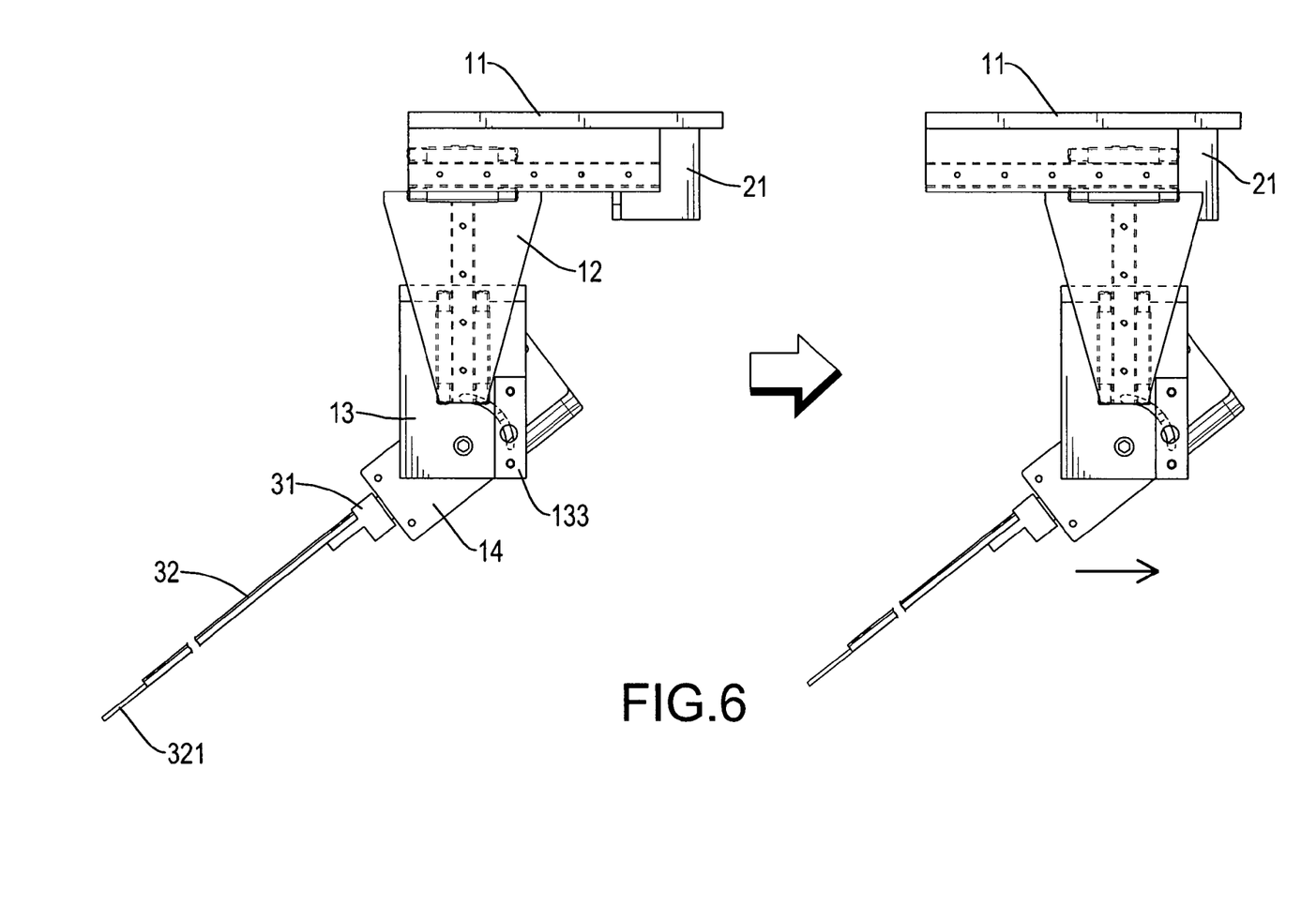
FIG. 6 are operational side views of the auto-scraping apparatus in FIG. 1 being moved.

The driving device 20 is connected to the tracking device 10 and has two linear motion units 21, 22 and a rotating motion unit 23. The linear motion units 21, 22 are respectively an X-axis linear motion unit 21 and a Z-axis linear motion unit 22. The X-axis linear motion unit 21 is securely mounted on the connecting frame 11 to drive the moving frame 12 to move forward or backward relative to the connecting frame 11 as shown in FIG. 6. The Z-axis linear motion unit 22 is securely mounted on the moving frame 12 to drive the lifting frame 13 to move upward or downward relative to the moving frame 12 as shown in FIG. 7. Preferably, the linear motion units 21, 22 may be linear stepper motors. With further reference to FIGS. 4 and 5, the rotating motion unit 23 is mounted in the tool frame 14 and has a front side, a rotating shaft 231 and a ball bearing 232. The rotating shaft 231 is rotatably mounted on and protrudes from the front side of the rotating motion unit 23 and extends out of the tool frame 14. The ball bearing 232 is mounted on the front side of the rotating motion unit 23 around the rotating shaft 231. Preferably, the rotating motion unit 23 is a servomotor.

The tool device 30 is detachably connected to the driving device 20 and has a tool carrier 31 and a relieving tool 32. The tool carrier 31 is securely mounted around the rotating shaft 231 of the rotating motion unit 23, is directly driven by the rotating shaft 231, is mounted in and abuts with the ball bearing 232 and has at least one mounting surface 311 opposite to the rotating shaft 231. The relieving tool 32 is securely mounted on the at least one mounting surface 311 of the tool carrier 31 and has a front end and a relieving panel 321. The relieving panel 321 is detachably connected to the front end of the relieving tool 32.

Figure 8:
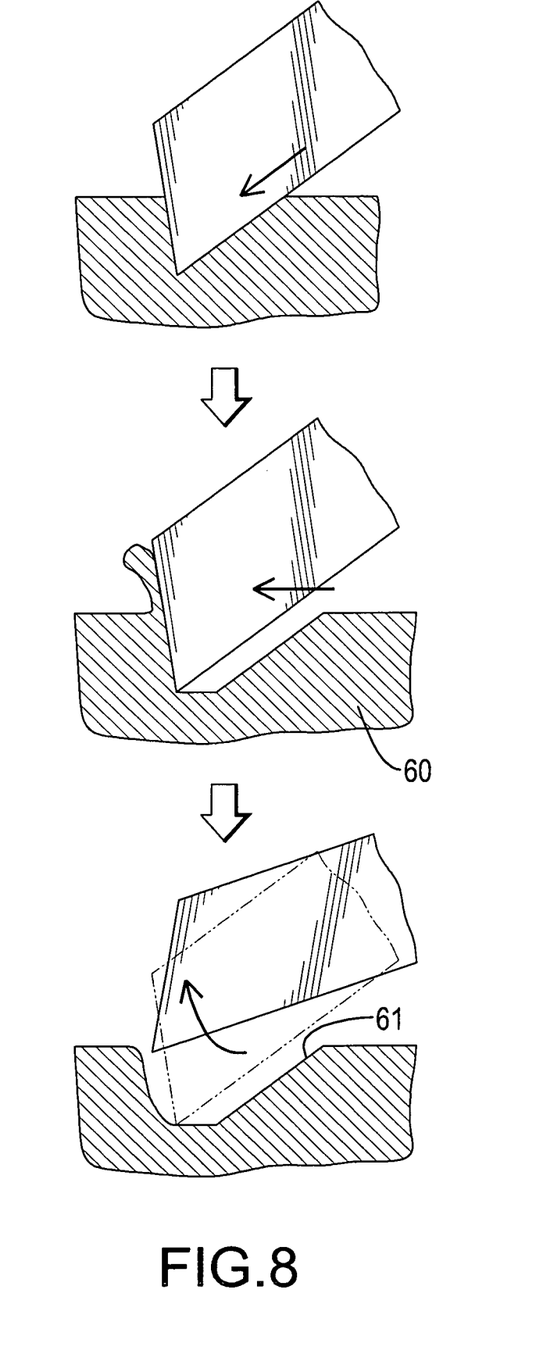
FIG. 8 are enlarged operational side views of the auto-scraping apparatus in FIG. 1 scraping a work piece.

When the auto-scraping apparatus in accordance with the present invention is used to scrape recesses 61 in a work piece 60, the motion units 21, 22, 23 of the driving device 20 are electrically connected to a computer. The computer comprises a shaft controlling card and a controlling program formed by a software of Laboratory Virtual Instrumentation Engineering Workbench (Lab-View). Then, the computer can control the movements of the moving frame 12 and the lifting frame 13 and the rotation of the driving shaft 231 of the rotating motion unit 23 as shown FIGS. 5, 6 and 7. With further reference to FIG. 8, the driving device 20 is actuated by the computer to move the relieving tool 32 toward a surface of a work piece 60 and scrape recesses 61 on the surface of the work piece 60 by a sticking step, a pushing step and a raising step. In addition, The controlling program can control the action sequence of the driving device 20 to design a scraping path of the relieving tool 32 for forming recesses 61 in different shapes, sizes or depths on the work piece 60.

Figure 9:
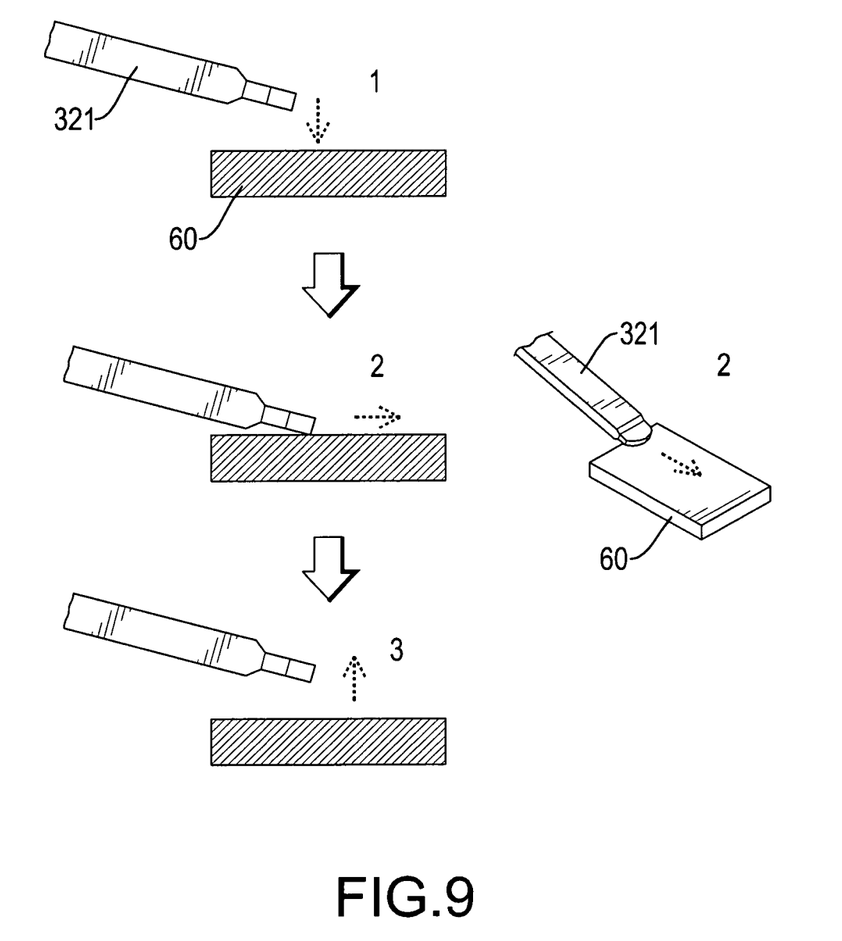
FIG. 9 are operational side views of the auto-scraping apparatus in FIG. 1 forming a quadrate recess.

With reference to FIG. 9, a quadrate recess can be scraped on the surface of the work piece 60 by firstly moving the relieving panel 321 downward to abut with the surface of the work piece 60, moving the relieving panel 321 forward relative to the work piece 60 horizontally and moving the relieving panel 321 upward to separate from the surface of the work piece 60.

Figure 10:
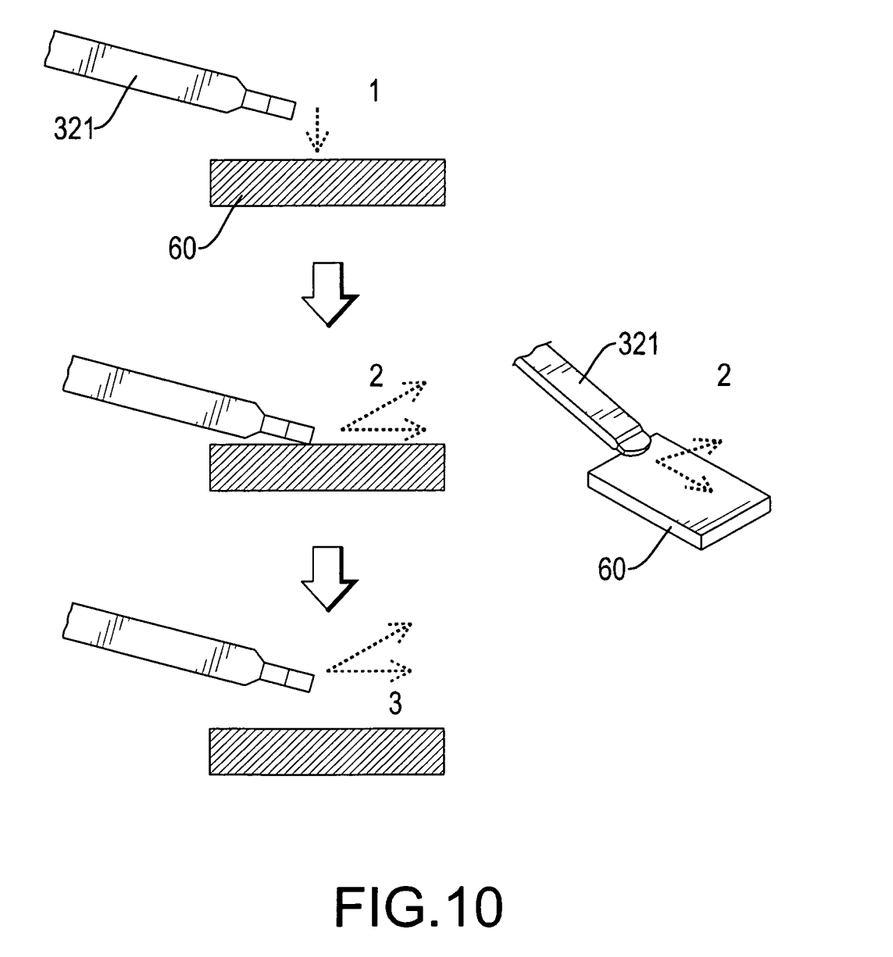
FIG. 10 are operational side views of the auto-scraping apparatus in FIG. 1 forming a triangular recess.

With reference to FIG. 10, a triangular recess can be scraped on the surface of the work piece 60 by moving the relieving panel 321 downward to abut with the surface of the work piece 60 and moving the relieving panel 321 forward and upward relative to the work piece 60 horizontally at the same time.

Figure 11:
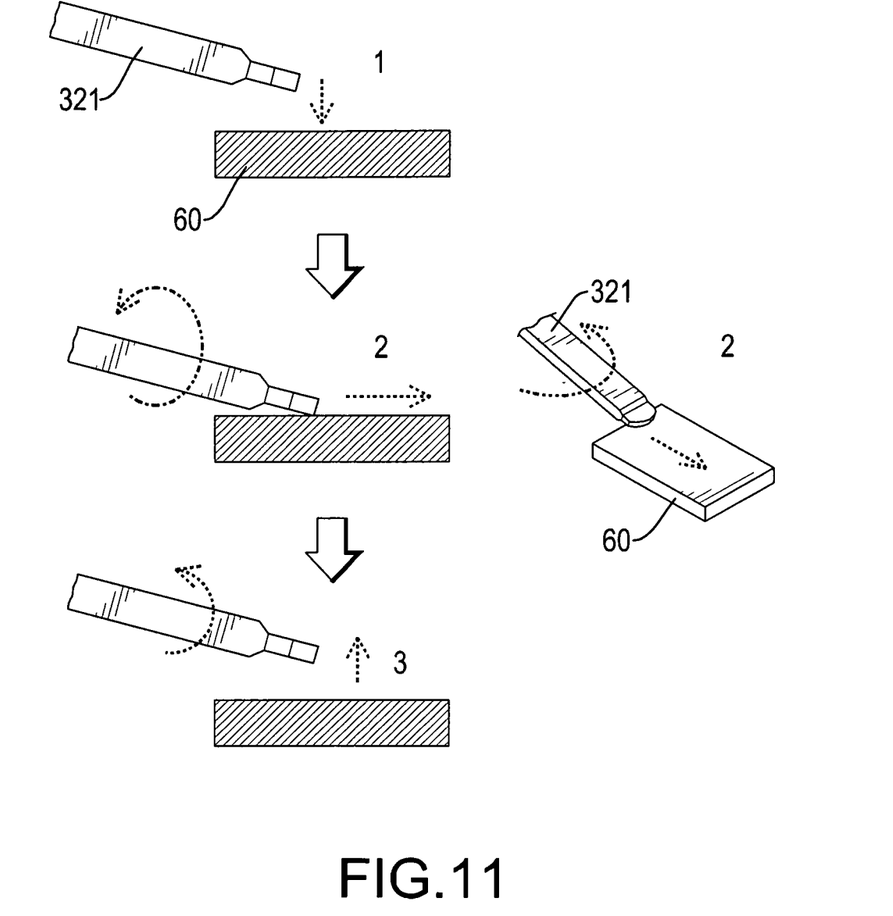
FIG. 11 are operational side views of the auto-scraping apparatus in FIG. 1 forming a half-moon shaped recess.

With reference to FIG. 11, a half-moon shaped recess can be scraped on the surface of the work piece 60 by moving the relieving panel 321 downward to abut with the surface of the work piece 60, moving the relieving panel 321 forward relative to the work piece 60 horizontally and rotating the relieving panel 321 at one direction at the same time and moving the relieving panel 321 upward to separate from the surface of the work piece 60.

Figure 12:
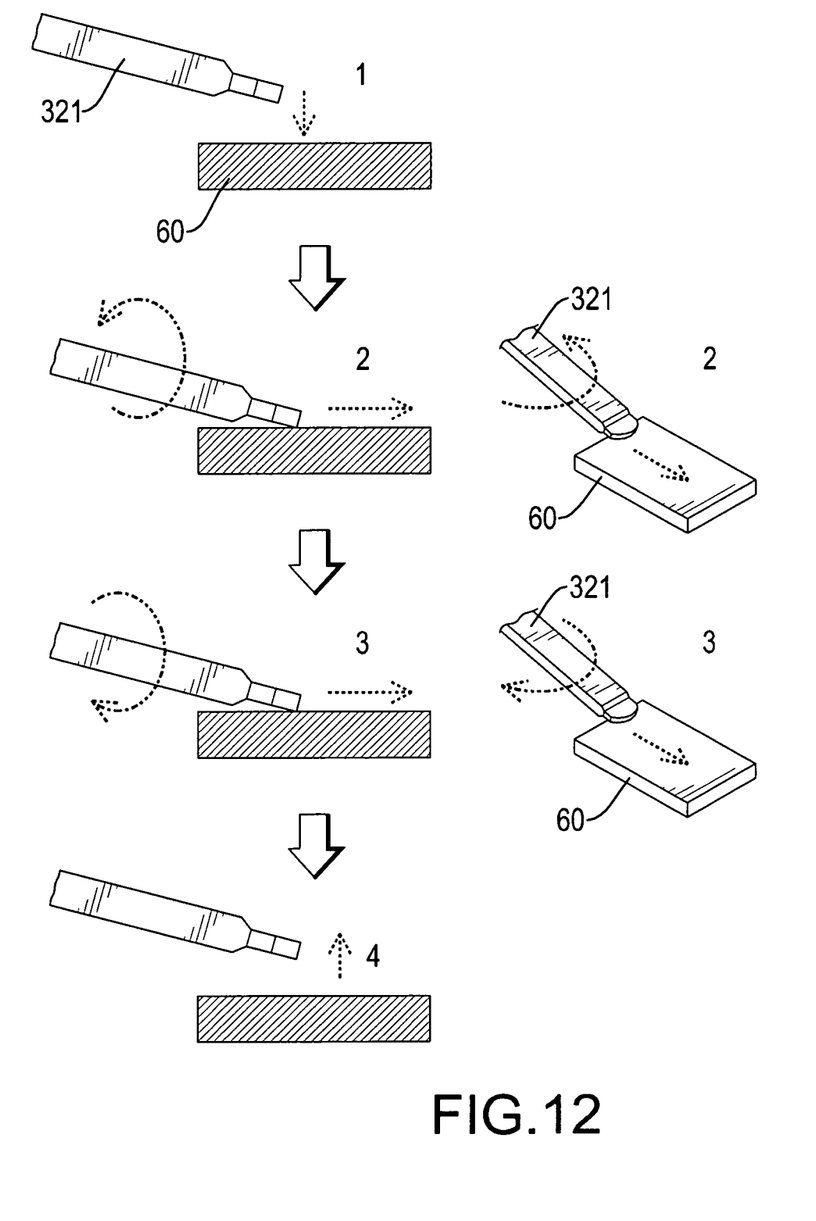
FIG. 12 are operational side views of the auto-scraping apparatus in FIG. 1 forming a plover-shaped recess.

With reference to FIG. 12, a plover-shaped recess can be scraped on the surface of the work piece 60 by moving the relieving panel 321 downward to abut with the surface of the work piece 60, moving the relieving panel 321 forward relative to the work piece 60 horizontally and rotating the relieving panel 321 at two inverse directions and moving the relieving panel 321 upward to separate from the surface of the work piece 60 finally.

Figure 13:
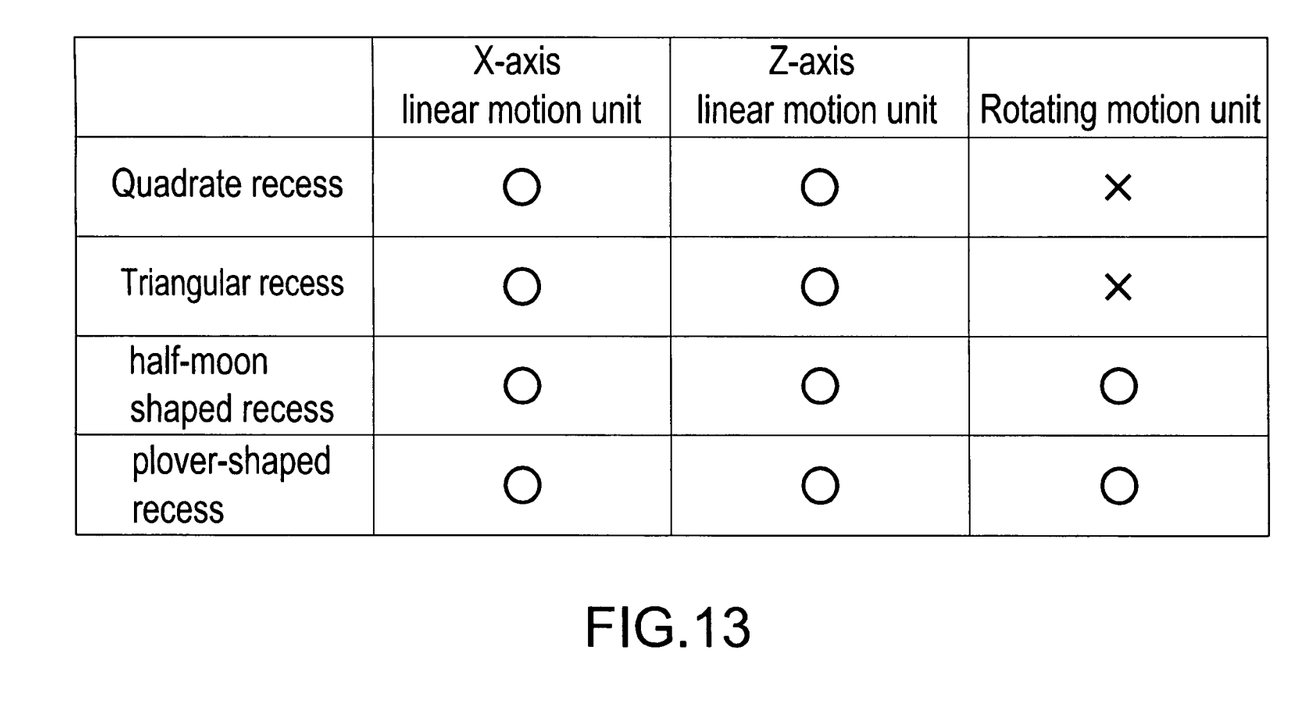
FIG. 13 is a table of the auto-scraping apparatus in FIG. 1 when scrapes different kinds of the recesses on the work piece by the motors.

Furthermore, the operations of the motion units 21, 22, 23 of the driving device 20 corresponding to the above-mentioned different shapes of the recess 61 on the work piece 60 are listed in FIG. 13. The recesses 61 on the work piece 60 can be conveniently and automatically scraped by the auto-scraping apparatus in accordance with the present invention and are similar to the recesses 61 that scraped by a professional with hands. Therefore, the auto-scraping apparatus in accordance with the present invention can be operated by driving the motion units 21, 22, 23 of the driving device 20 that controlled by the computer to simulate the operation of the professional's hands. Then, all kinds of the recesses 61 can be scraped by the auto-scraping apparatus in accordance with the present invention.

In addition, the ball bearing 232 is mounted on the front side of the rotating motion unit 23 around the rotating shaft 231 and can transmit the impulse force of the relieving tool 32 to the exterior of the rotating motion unit 23. This can prevent the impulse force of the relieving tool 32 from directly transmitting to the rotating shaft 231 of the rotating motion unit 23 and the life of the rotating motion unit 23 will be longer than that of a rotating motion unit 23 without using the ball bearing 232. Furthermore, the ball bearing 232 can prevent a holding effect to the tool carrier 31 to prevent the impulse force of the relieving tool 32 from influencing the scraping path of the tool device 30.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An auto-scraping apparatus for a work piece of a hard rail comprising:
   a tracking device having
   a connecting frame;
   a moving frame movably connected to the connecting frame;

a lifting frame movably connected to the moving frame; and
a tool frame pivotally connected to the lifting frame;
a driving device connected to the tracking device and having
two linear motion units, one of the linear motion units, driving the moving frame to move forward or backward relative to the connecting frame and the other linear motion unit, driving the lifting frame to move upward or downward relative to the moving frame; and
a rotating motion unit mounted in the tool frame and having a front side; and
a rotating shaft rotatably mounted on and protruding from the front side of the rotating motion unit and extending out of the tool frame; and
a ball bearing mounted on the front side of the rotating motion unit around the rotating shaft; and
a tool device detachably connected to the driving device and having
a tool carrier securely mounted around the rotating shaft of the rotating motion unit, directly driven by the rotating shaft, mounted in and abutting with the ball bearing and having at least one mounting surface opposite to the rotating shaft; and
a relieving tool securely mounted on the at least one mounting surface of the tool carrier and having
a front end; and
a relieving panel detachably connected to the front end of the relieving tool.

2. The auto-scraping apparatus as claimed in claim 1, wherein
the connecting frame has
two sidewalls, each sidewall of the connecting frame having an inner surface facing to each other; and
two transversal rails respectively mounted on the inner surfaces of the sidewalls of the connecting frame;
the moving frame has
two opposite sidewalls respectively facing to the sidewalls of the connecting frame and each opposite sidewall having
an outer surface; and
an inner surface;
two sliding blocks respectively mounted on the outer surfaces of the opposite sidewalls of the moving frame and respectively and movably mounted on the transversal rails of the connecting frame; and
two longitudinal rails respectively mounted on the inner surfaces of the opposite sidewalls of the moving frame and being perpendicular to the transversal rails; and
the lifting frame has
two sidewalls respectively face to the inner surfaces of the opposite sidewalls of the moving frame and each sidewall of the lifting frame having
an outer surface; and
an inner surface; and
two lifting blocks respectively mounted on the outer surfaces of the sidewalls of the lifting frame and respectively and movably mounted on the longitudinal rails of the moving frame.

3. The auto-scraping apparatus as claimed in claim 2, wherein the lifting frame has
an adjusting groove being curved and formed through one of the sidewalls of the lifting frame; and
a holding mount mounted on the sidewall of the lifting frame in which the adjusting groove being defined and having a connecting hole formed through the holding mount and communicating with the adjusting groove.

4. The auto-scraping apparatus as claimed in claim 3, wherein
one of the linear motion units, is an X-axis linear motion unit securely mounted on the connecting frame to drive the moving frame to move forward or backward relative to the connecting frame; and
the other linear motion unit, is a Z-axis linear motion unit securely mounted on the moving frame to drive the lifting frame to move upward or downward relative to the moving frame.

5. The auto-scraping apparatus as claimed in claim 4, wherein the connecting frame is U-shaped and is adapted to securely connect to a spindle of a CNC machine tool or a three-dimensional rack device.

6. The auto-scraping apparatus as claimed in claim 1, wherein the lifting frame has
an adjusting groove being curved and formed through one of the sidewalls of the lifting frame; and
a holding mount mounted on the sidewall of the lifting frame that formed the adjusting groove and having a connecting hole formed through the holding mount and communicating with the adjusting groove.

7. The auto-scraping apparatus as claimed in claim 1, wherein
one of the linear motion units, is an X-axis linear motion unit securely mounted on the connecting frame to drive the moving frame to move forward or backward relative to the connecting frame; and
the other linear motion unit, is a Z-axis linear motion unit securely mounted on the moving frame to drive the lifting frame to move upward or downward relative to the moving frame.

8. The auto-scraping apparatus as claimed in claim 2, wherein
one of the linear motion units, is an X-axis linear motion unit securely mounted on the connecting frame to drive the moving frame to move forward or backward relative to the connecting frame; and
the other linear motion unit, is a Z-axis linear motion unit securely mounted on the moving frame to drive the lifting frame to move upward or downward relative to the moving frame.

9. The auto-scraping apparatus as claimed in claim 8, wherein the connecting frame is U-shaped and is adapted to securely connect to a spindle of a CNC machine tool or a three-dimensional rack device.

* * * * *